United States Patent
Nakamura et al.

(12) 
(10) Patent No.: US 6,192,555 B1
(45) Date of Patent: Feb. 27, 2001

(54) HOSE CLIP OF THE SELF-HOLDING TYPE

(75) Inventors: Yuji Nakamura; Mineo Muto, both of Aichi (JP)

(73) Assignee: Togo Seisakusyo Corporation, Aichi (JP)

(*) Notice: Subject to any disclaimer, the term of this patent is extended or adjusted under 35 U.S.C. 154(b) by 0 days.

(21) Appl. No.: 09/250,178

(22) Filed: Feb. 16, 1999

(30) Foreign Application Priority Data

Jul. 2, 1998 (JP) ................................. 10-187309

(51) Int. Cl.$^7$ .............................. B65D 63/02; F16L 33/20
(52) U.S. Cl. .................. 24/20 R; 24/20 CW; 24/20 S; 24/23 R
(58) Field of Search ................................. 24/20 R, 20 S, 24/23 R, 20 CW

(56) References Cited

U.S. PATENT DOCUMENTS

| | | | |
|---|---|---|---|
| 4,930,191 | * 6/1990 | Takahashi et al. | 24/20 R |
| 4,930,192 | * 6/1990 | Muhr | 24/20 R |
| 4,996,749 | * 3/1991 | Takahashi | 24/20 R |
| 5,185,907 | 2/1993 | Kawashima et al. | |
| 5,706,557 | * 1/1998 | Beicht | 24/20 R |
| 5,715,579 | * 2/1998 | Beicht et al. | 24/20 R |
| 5,855,044 | * 1/1999 | Cradduck | 24/20 S |

FOREIGN PATENT DOCUMENTS 6-35779  5/1994 (JP).

\* cited by examiner

*Primary Examiner*—Victor N. Sakran
(74) *Attorney, Agent, or Firm*—Wenderoth, Lind & Ponack, L.L.P.

(57) ABSTRACT

A hose clip of the self-holding type includes a clamping ring made by circularly bending a band-shaped leaf spring. A first knob is formed by cutting off a central portion of the clamping ring at a side of its first end in a predetermined range of its length to obtain a groove-like opening and by raising the end of the clamping ring radially. The first knob includes a generally arch-shaped portion. A second knob includes a narrow portion at a side of the second end of the clamping ring, and os formed by fitting the narrow portion into the opening and passing under the arch-shaped portion of the first knob and by raising the second end of the clamping ring radially with respect to the clamping ring so that the second knob confronts the first knob. An abutment face is formed on a surface of the arch-shaped portion of the first knob opposed to a surface of the arch-shaped portion confronting the second knob. A single locking claw is formed by raising a portion defined between two spaced-apart slits each extending from one side edge of the second knob approximately to a widthwise center of the second knob. The locking claw holds the clamping ring in a spread-diameter state when engaging the abutment face, and permits the clamping ring to turn to a reduced-diameter state when disengaged from the abutment face.

7 Claims, 9 Drawing Sheets

HOSE CLIP OF THE SELF-HOLDING TYPE

BACKGROUND OF THE INVENTION

1. Field of the Invention

This invention relates generally to hose clips for clamping hoses, and more particularly to a hose clip of the self-holding type having a function of holding itself in a spread-diameter state (i.e., state in which the hose clip has a large diameter).

2. Description of the Prior Art

There have conventionally been provided hose clips for clamping hoses utilizing an internal spring force. In view of a working efficiency, these hose clips are desired to be carried to a working site in a spread-diameter state. The hose clips are divided into two types depending on the manner in which they are held in the spread-diameter state. One is a holder type in which a holder discrete from the hose clip clamps both ends of the hose clip to thereby hold it in the spread-diameter state. The other is a holderless or self-holding type in which the hose clip can hold itself in the spread-diameter state. In the former type, when the holder is pulled out of the hose clip so that the hose clip is released from the spread-diameter state, the hose clip throws offthe holder due to its spring-force. As a result, a number of holders scatter around the working site. This results in a problem. Accordingly, the self-holding type hose clips have recently been used widely.

FIG. 13 illustrates one of the conventional self-holding type hose clips. The hose clip shown comprises a clamping ring 101 made by bending a band-shaped leaf spring into a circular form. The clamping ring 101 has both ends crossed and then raised radially to thereby be formed into first and second knobs 102 and 103 respectively. The first knob 102 is formed into the shape of an arch and has an operation hole formed through an upper portion thereof. The second knob 103 is formed into the shape of an elongated strip and has such a width that it can pass under the first knob. The second knob 103 has a pair of locking claws 105 formed on the middle thereof The locking claws 105 engage an arch-shaped portion of the first knob 102 so that the hose clip is held in the spread-diameter state.

The hose clip is released from the spread-diameter state in the following manner. A releasing tool T such as a screwdriver is inserted into the operation hole 104 of the first knob 102 from the second knob 103 side as shown by the solid line in FIG. 14. The tool T is then moved downward with an upper end of the second knob 103 as a fulcrum, so that the second knob 103 is displaced radially. Consequently, both locking claws 105 are disengaged from the arch portion 102a of the first knob 102, and the spring force rapidly deforms (contracts) the clamping ring into a reduced-diameter state.

However, the above-described hose clip of the self-holding type has the following problems. First, the specification of a hose clip including the clamping force applied to a hose and a clamping width generally determines the thickness and the width of the material for the hose clip. In the aboved-described hose clip, both side edges of the root portion at the second knob 103 side are raised into the pair of locking claws 105. A sufficient width of the portion of the clamping ring provided with the locking claws 105 is not always ensured relative to the thickness of the second knob 103. In such a case, when the locking claws 105 are formed by bending both side edges of the second knob 103 which has a large thickness even though having a small width, the width of the root portion of the locking claws 105 is insufficient such that a pair of locking claws cannot be formed. If one side edge of the second knob 103 should be bent into a single locking claw, the engaging force of the locking claw would be unbalanced widthwise. As a result, the hose clip would have a problem of twisting.

Secondly, the releasing tool T is inserted in the operation hole from the second knob 103 side in the releasing operation as described above. However, when the direction in which the hose clip is fitted with the hose is not fixed, the second knob 103 is directed rightward and leftward. If the tool T should be caused to enter the operation hole 104 from the first knob 102 side, the tool T would be inserted into the operation hole 104 obliquely upward with an operating side thereof being directed downward. In this case, since an operating angle of the tool T is large, the tool T interferes with the clamping ring 101 such that the tool cannot be manipulated. Particularly in the case of a hose clip used in a small space such as an engine room of an automobile, inserting the operating side of the tool T deep into the operation hole is disadvantageous.

Thus, in the above-described hose clip, the degree of freedom in the releasing work is low since the direction in which the releasing tool is inserted is limited in the releasing operation.

SUMMARY OF THE INVENTION

Therefore, an object of the present invention is to provide a hose clip which can accomplish a stable clamping state and has an advantage in the manipulation.

The present invention provides a hose clip comprising a clamping ring made by circularly bending a band-shaped leaf spring having two ends. A first knob is formed by cutting off a central portion of the clamping ring at a side of a first end thereof in a predetermined range of a length thereof to thereby obtain a groove-like opening and by raising the first end of the clamping ring radially with respect to the clamping ring. The first knob includes a generally arch-shaped portion. A second knob includes a reduced-width portion at a side of the second end of the clamping ring. The second knob is formed by fitting the reduced-width portion into the opening and passing it under the arch-shaped portion of the first knob, and by raising the second end of the clamping ring radially with respect to the clamping ring so that the second knob confronts the first knob. An abutment face is provided on a surface of the arch-shaped portion of the first knob opposed to a surface of the arch-shaped portion confronting the second knob. A single locking claw is formed by raising a portion defined between two spaced-apart slits (each extending from one side edge of the second knob) approximately to a widthwise center of the second knob. The locking claw holds the clamping ring in a spread-diameter state when engaging the abutment face and the locking claw permits the clamping ring to turn to a reduced-diameter state when it is disengaged from the abutment face.

According to the above-described construction, the single locking claw is formed on the second knob. This construction is effective in a hose clip including a clamping ring having such a small width that a pair of locking claws cannot be provided on both side edges thereof, respectively.

The locking claw applies a spring force of the clamping ring to the abutment face when the clamping ring is in the spread-diameter state. Accordingly, when only one locking claw is provided, there is a possibility that the hose clip may be twisted. In the above-described hose clip, however, the single locking claw stands substantially away from the widthwise center of the clamping ring and abuts the central portion of the abutment face. Consequently, since the spring force applied to the abutment face is balanced widthwise on the right-hand and left-hand sides thereof, the hose clip can be prevented from being twisted.

In a preferred form, the hose clip further comprises a releasing portion provided for releasing the clamping ring from a spread-diameter state. The releasing portion is formed by hollowing a portion of the first knob radially over the abutment face so that it permits insertion of a releasing jig from the second knob side. In this case, the jig is manipulated radially inside a clamping portion in abutment both with the second knob and with an upper part of the releasing portion so that leverage is effected, thereby releasing the clamping ring from the spread-diameter state.

In order that the hose clip may be released from the spread-diameter state, the releasing jig is inserted from the second knob side so that its distal end abuts the releasing portion of the first knob. The releasing jig is then manipulated so that leverage is effected with the upper end of the second knob serving as a fulcrum. As a result of the leverage, the first and second knobs are moved radially (with respect to the hose clip) relative to each other, so that the locking claw is disengaged from the abutment face. Consequently, the spring force of the clamping ring quickly turns the hose clip to the reduced-diameter state.

In another preferred form, the hose clip further comprises an escape window formed by cutting out a portion of the first knob side by side with the abutment face so as to permit the locking claw to pass therethrough. In this case, the locking claw is pushed by the releasing jig when the releasing jig is forced between an inner edge of the escape window at the abutment face side and the locking claw. Thus, the locking claw is disengaged from the abutment face sidewise and passes through the escape window, so that the clamping ring is released from the spread-diameter state.

According to the above-described construction, the releasing jig is inserted between opposed side edges of the first and second knobs and twisted so that a portion of the hose clip between the knobs is axially displaced. With this, the locking claw is located so as to be opposed to the escape window, passing through the escape window, whereupon the hose clip is turned to the reduced-diameter state. Thus, both knobs are radially moved so that the hose clip is released from the spread-diameter state. Accordingly since the releasing jig can be inserted from either knob side, the degree of freedom in the releasing work can be improved.

In another preferred form, the hose clip further comprises a receiving portion formed on the second knob so as to be located substantially at a level of the releasing portion. The receiving portion receives a distal end of the releasing jig inserted into the releasing portion from the locking claw side such that the receiving portion is pushed radially inward with respect to the clamping ring by leverage of the releasing jig in a radially outward direction. Thus, the locking claw is displaced radially inward, and passes under the arch-shaped portion of the first knob, so that the clamping ring is released from the spread-diameter state.

According to the above-described construction, when inserted from the second knob side, the releasing jig abuts the upper end of the second knob and the releasing portion in the same manner as described above. On the other hand, when inserted from the first knob side, the releasing jig abuts the releasing portion and the receiving portion and is then manipulated.

In another preferred form, the hose clip further comprises a protrusion provided on one side end of the second knob so as to be located in the rear of the locking claw with respect to the second knob, and so as to be directed radially inward. The protrusion receives a root portion of the releasing jig inserted into the releasing portion from the locking claw side such that the protrusion is pushed radially inward with respect to the clamping ring by leverage of the releasing jig in a radially outward direction. Thus, the locking claw is displaced radially inward, and passes under the arch-shaped portion of the first knob, so that the clamping ring is released from the spread-diameter state. In this construction, when inserted from the first knob side, the releasing jig abuts the protrusion and the first knob and is then manipulated to release the hose clip from the spread-diameter state, so that the locking claw is disengaged from the abutment face.

BRIEF DESCRIPTION OF THE DRAWINGS

Other objects, features and advantages of the present invention will become clear upon reviewing the following description of the preferred embodiments, made with reference to the accompanying drawings, in which.

DETAILED DESCRIPTION OF THE PREFERRED EMBODIMENTS

Figure 1:
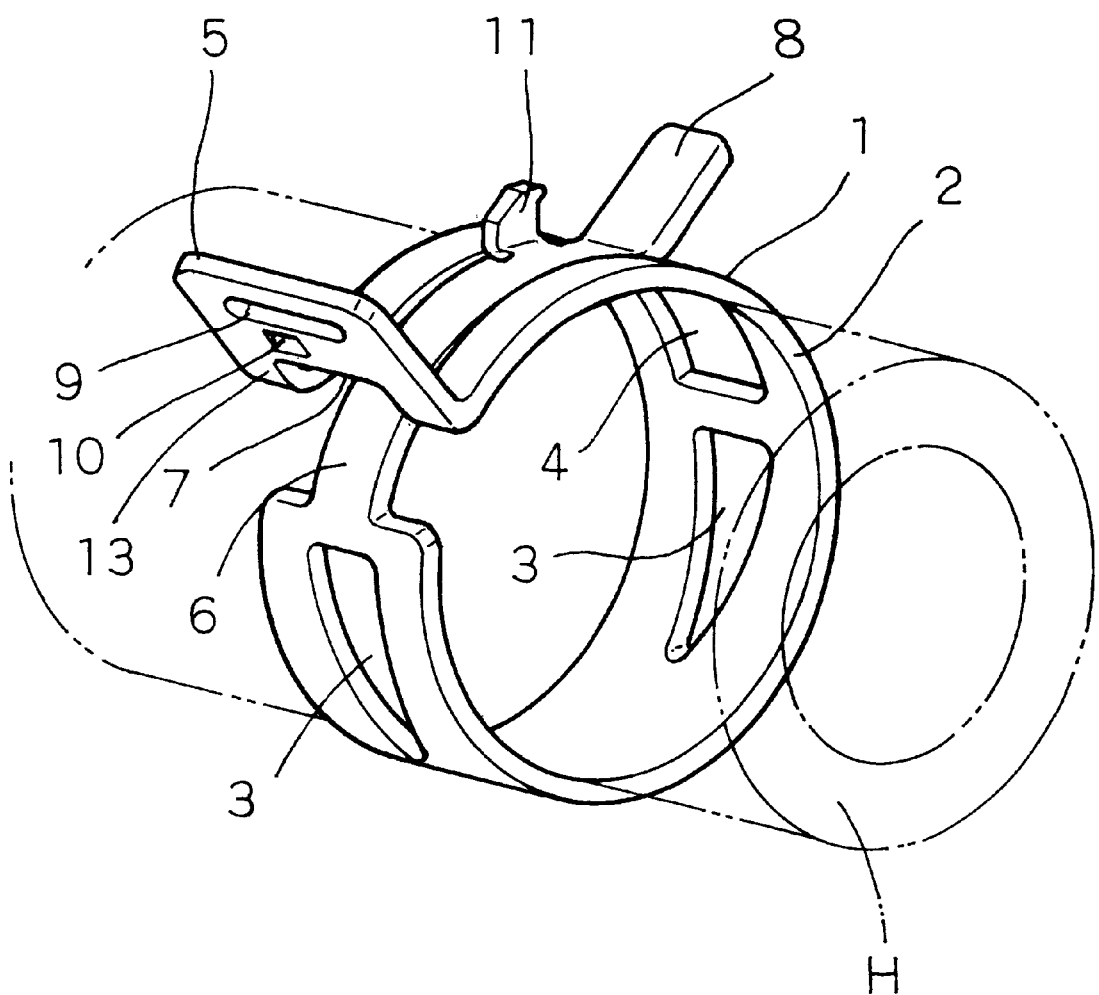
FIG. 1 is a perspective view of a hose clip of a first embodiment in accordance with the present invention, the hose clip being in the reduced-diameter state.
Figure 2:
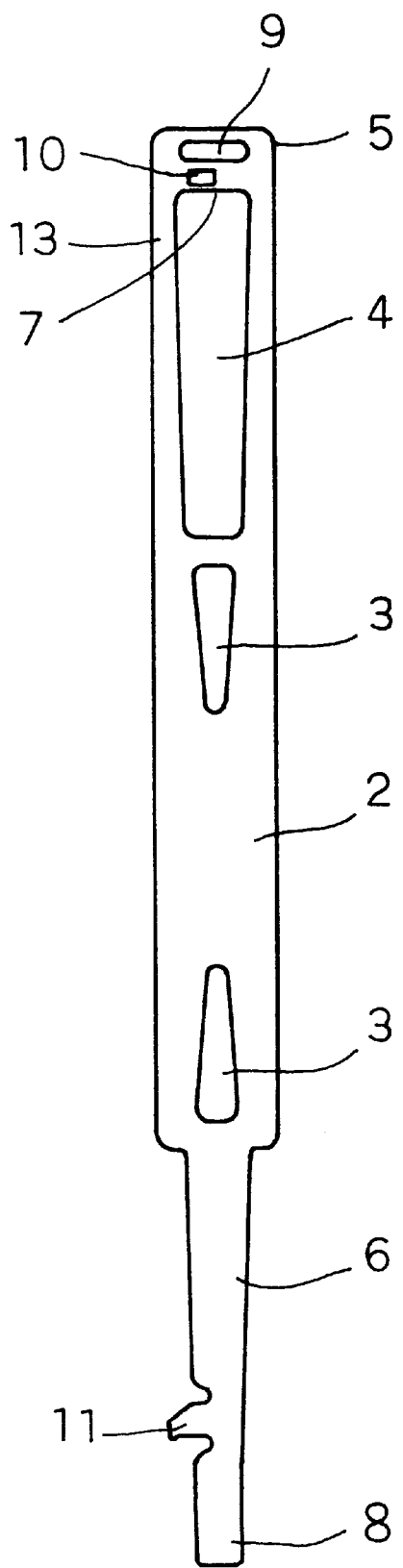
FIG. 2 is a development view of the hose clip.

A first embodiment of the present invention will be described with reference to FIGS. 1 to 6. A hose clip 1 of the first embodiment is used to clamp ajunction of a hose H and a pipe as shown in FIG. 1. The hose clip 1 is in a reduced-diameter state in which the hose clip 1 is capable of clamping the hose H. The hose clip 1 comprises a clamping ring 2 formed by circularly bending a band-shaped leaf spring. The clamping ring 2 has two triangular openings formed so that a uniform clamping force is applied to the overall circumference of the hose H.

The clamping ring 2 has a groove (circumferential opening) 4 formed at a side of the first of two ends thereof, and the groove 4 has a predetermined length. A distal end of the clamping ring 2 including part of the groove 4 is raised radially with respect to the clamping ring 2 so that a first knob 5 including an arch-shaped opening 7 is formed, The clamping ring 2 has a tapered narrow or reduced-width portion 6 formed at a side of the other end thereof and having approximately the same length as the groove 4. A distal end of the reduced-width portion 6 passes under the arch-shaped opening 7 of the first knob 5, and is inserted into the groove 4 so that the reduced-width portion 6 is substantially planar with a portion of the clamping ring 2 around the groove 4. A distal end of the reduced-width portion 6 is raised substantially radially with respect to the clamping ring 2 so as to stand approximately at the level of the first knob 5, thereby serving as a second knob 8.

The first knob 5 includes a releasing opening 9 open widthwise with respect to the clamping ring 2. The releasing opening 9 is used when the hose clip 1 is released from a spread-diameter state. The releasing opening 9 has such an opening that a releasing jig T such as a screwdriver can be inserted therethrough. The first knob 5 further includes a generally concave abutment face 10 located below the releasing opening 9 and in the vicinity of the widthwise center of the knob. A locking claw 11 disengageably engages the abutment face 10 as will be described later. A lower edge of the abutment face 10 has an inclined face downwardly inclined (toward a longitudinal axis of hose clip 1) although not shown in the drawings. The inclined face is provided in order that the locking claw 11 may engage and disengage from the abutment face smoothly.

Figure 3:
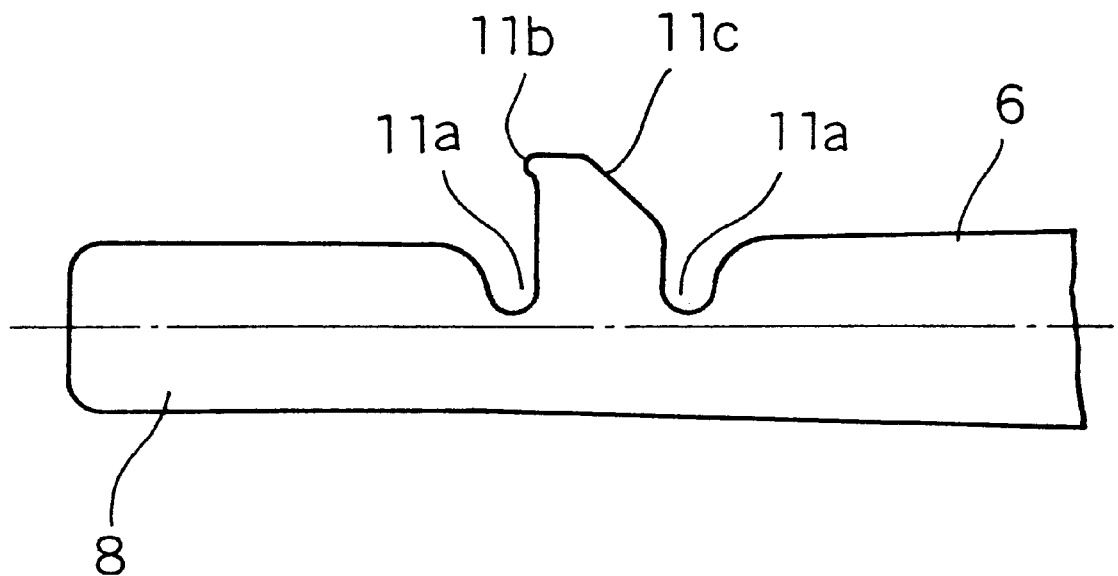
FIG. 3 is an enlarged view of a locking claw.

The locking claw 11 is formed on a root portion of the second knob 8 in the narrow portion 6. As shown in FIG. 3, the locking claw 11 is formed by outwardly ((in a radial direction of hose slip 1) raising a portion defined between two spaced-apart slits 11a each extending from one side edge of the reduced-width portion 6 approximately to a widthwise center line in a direction generally perpendicular to the side edge. The locking claw 11 is thus located approximately at the widthwise center line on the reduced-width portion 6 or at a widthwise center line of the hose clip 1. The locking claw 11 has on a distal end thereof a projection 11b providing a means for engagement with the abutment face 10. The locking claw 11 further has a downwardly inclined guide face 11c formed on a rear edge thereof When the knobs 5 and 8 are gripped so that the hose clip is changed from the reduced-diameter state to the spread-diameter state, the guide face 11c is slid on the upper edge of the arch-shaped opening 7 (lower edge of the first knob), thereby promoting a radially inward deformation of the second knob 8 side.

Figure 5:
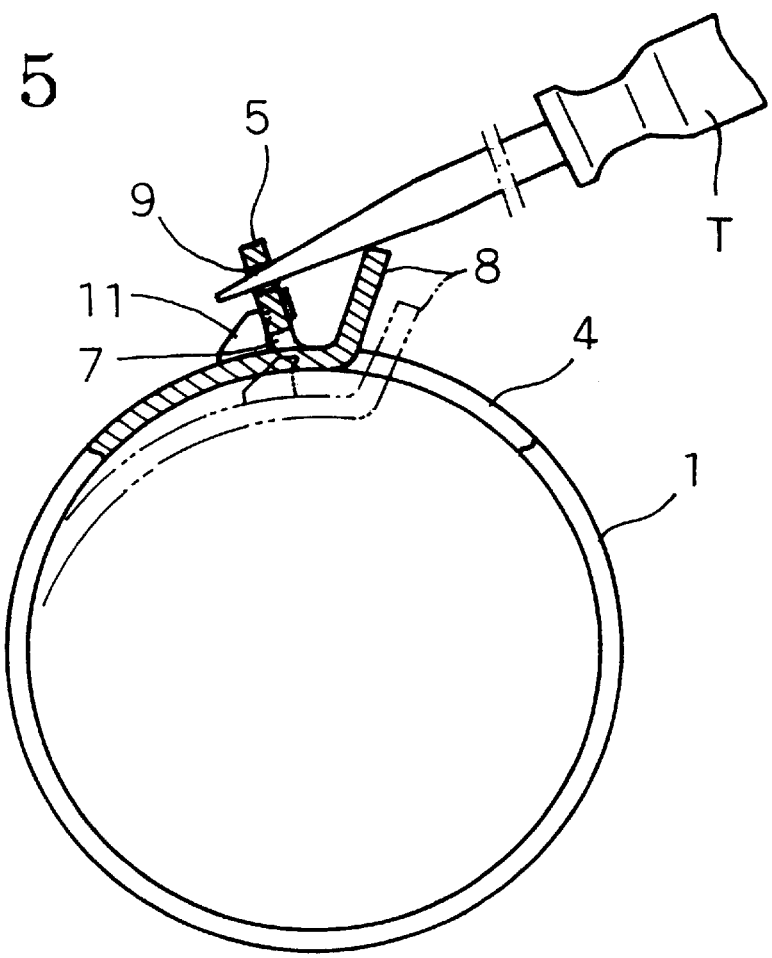
FIG. 5 is a partially broken front view of the hose clip in the spread-diameter state, showing a releasing work.
Figure 4:
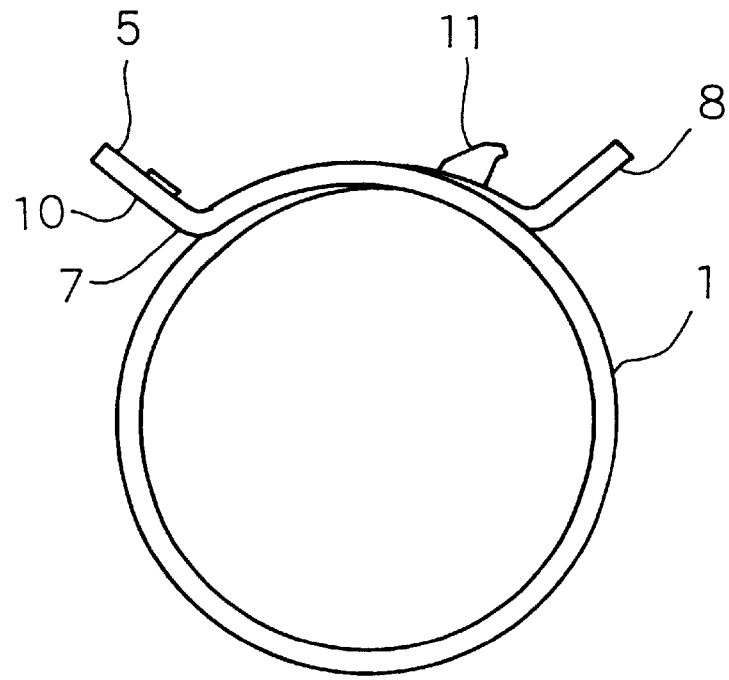
FIG. 4 is a front view of the hose clip in the reduced-diameter state.
Figure 6:
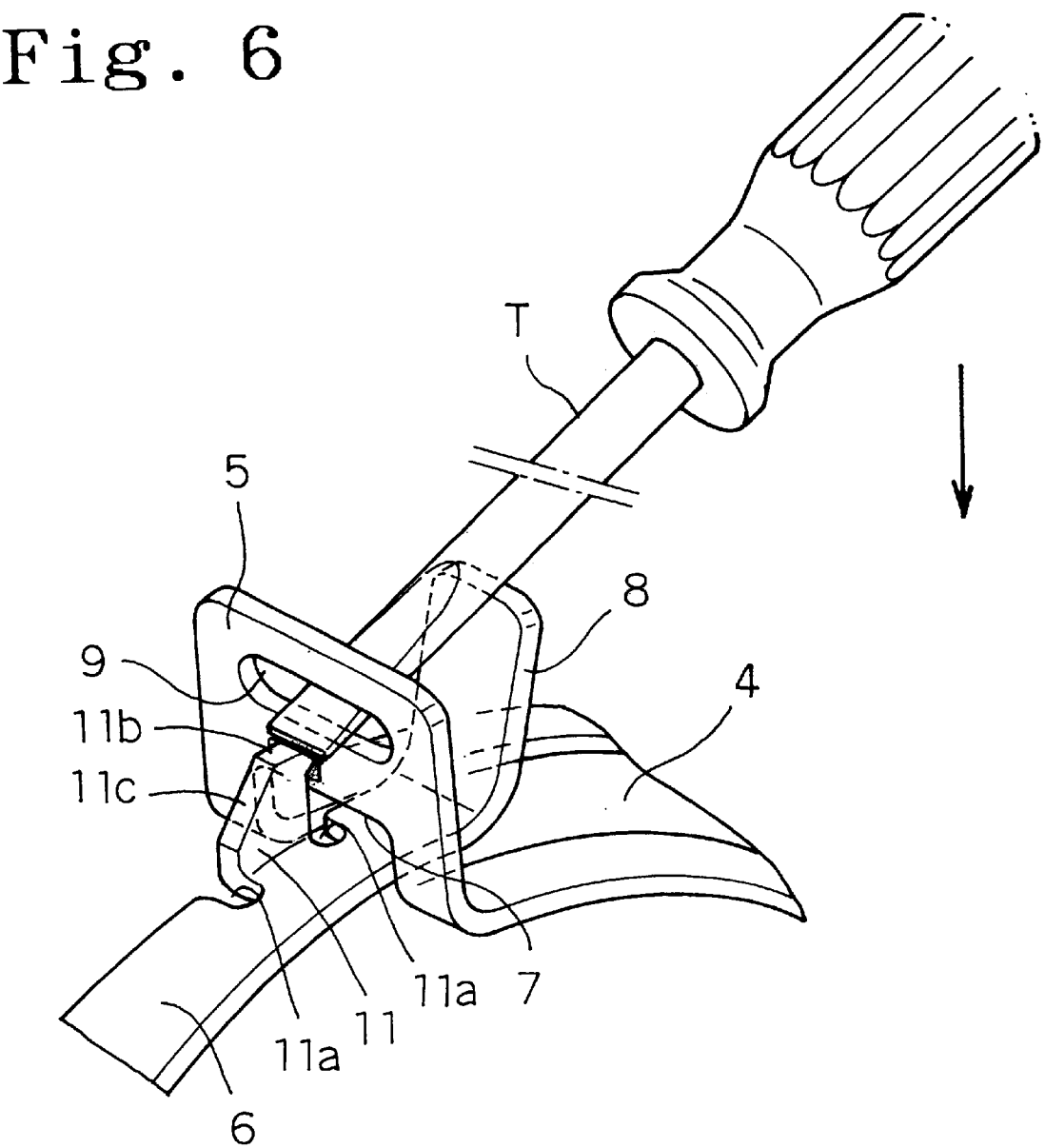
FIG. 6 is a perspective view of the hose clip, showing the releasing work.

The operation of the hose clip will now be described. The hose clip 1 is carried to a working site for connection to a hose in the spread-diameter state in which the locking claw 11 is in engagement with the abutment face 10 as shown in FIG. 5. At the working site, the clamping ring 2 of the hose clip 1 in the spread-diameter state is fitted on a suitable portion of a hose end. In this state, the hose is connected to a pipe and the hose clip 1 is moved to a predetermined clamping position. The distal end of the releasing tool T is inserted into the releasing opening 9 of the first knob 5 from the second knob 8 side in order that the hose clip 1 may be released from the spread-diameter state, as shown in FIGS. 5 and 6. Thereafter, the distal end of the releasing tool T is applied to a distal end of the second knob 8 and then pushed downward with a point of application serving as a fulcrum. As a result, the second knob 8 is deflected radially inward as shown by the imaginary line in FIG. 5. With this, the locking claw 11 disengages from the abutment face 10, and is capable of passing through the arch-shaped opening 7 of the first knob 5. A spring force of the clamping ring 2 rapidly turns the hose clip 1 to the reduced-diameter state as shown in FIG. 4. The hose clip thus clamps the hose to thereby ensure connection of the hose to the pipe.

On the other hand, in order that the hose clip 1 may be returned from the reduced-diameter state to the spread-diameter state for disconnection of the hose from the pipe, the first and second knobs 5 and 8 are gripped with a gripping jig such as pliers. The arch-shaped opening 7 strikes against the locking claw 11 to thereby be guided by the inclined guide face 11c such that the locking claw 11 passes through the arch-shaped opening 7. The spring force then returns the locking claw 11 radially outward, so that the projection 11b of the locking claw 11 is located in the abutment face 10 of the second knob 8, so as to be engaged therewith. As a result, the hose clip 1 is held in the spread-diameter state.

In the previously described conventional hose clip, the two locking claws are provided on both sides of the narrow portion. Furthermore, the thickness of the leaf spring needs to be increased so that the hose clip has a large clamping force. However, this results in an increase in the dimensions required for the bending of the locking claw. Consequently, two locking claws cannot be provided because of a limited width of the hose clip. In this case, the conventional hose clip has the problem of twisting when provided with a single locking claw. On the other hand, the construction of the foregoing embodiment is effective in manufacturing a hose clip having a limited width and yet a large spring force. Further, the problem of twisting can be overcome in the construction of the foregoing embodiment. More specifically, the locking claw 11 stands substantially in the widthwise center of the clamping ring 2 and abuts the central portion of the abutment face 10. Consequently, since the spring force applied to the abutment face 10 is balanced widthwise on the right-hand and left-hand sides thereof, the hose clip 1 can be prevented from being twisted.

The releasing jig T is inserted from the second knob 8 side in order that the hose clip 1 may be released from the spread-diameter state in the foregoing embodiment. However, when the direction of the hose clip is unfixed in a space such as an engine room of an automobile, it is advantageous that the releasing jig should be inserted from either side.

Figure 7:
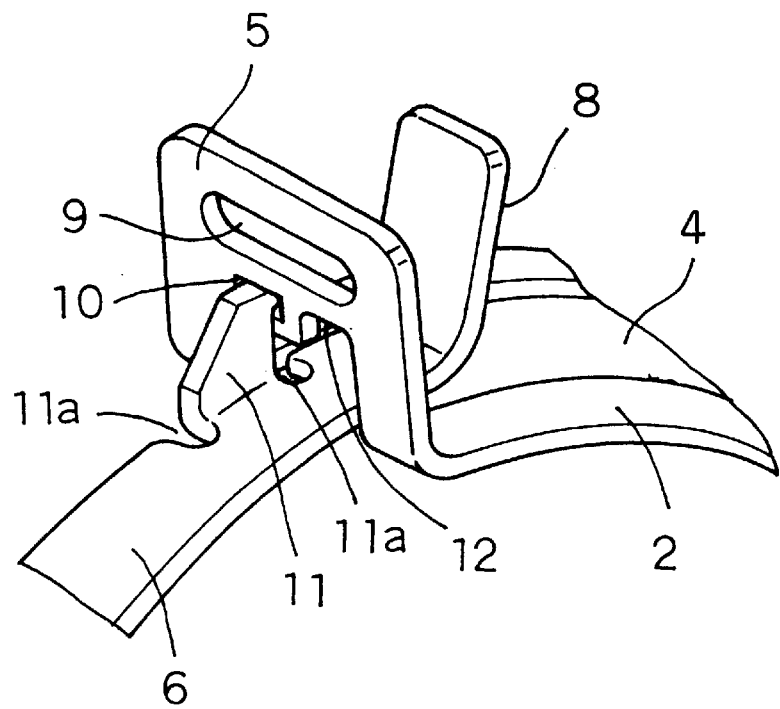
FIG. 7 is a perspective view of the hose clip of a second embodiment in accordance with the invention.
Figure 8:
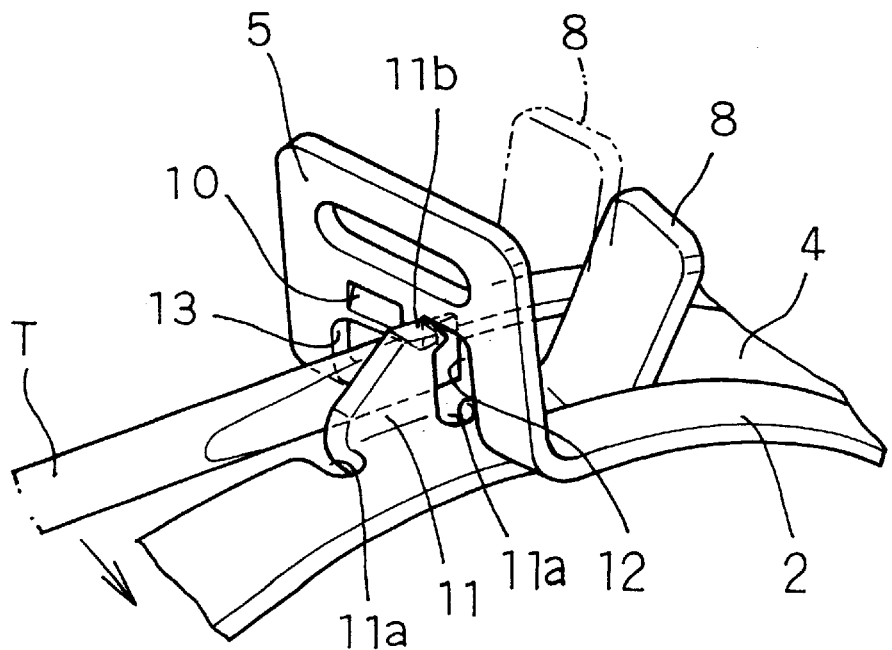
FIG. 8 is a perspective view of the hose clip, showing the releasing work.

A second embodiment of the invention is directed to a hose clip which can be manipulated from the other side in the releasing work. The second embodiment will be described with reference to FIGS. 7 and 8. The hose clip shown in FIG. 7 differs from that of the first embodiment in that an escape window 12 having a larger width and height than the locking claw 11 is provided at one side of the abutment face 10 on the first knob 5. The remaining construction of the hose clip in the second embodiment is the same as in the first embodiment. The identical or similar parts in the second embodiment are labeled with the same reference symbols as in the first embodiment. The description of these parts will be eliminated.

In the operation of the hose clip 1 of the second embodiment, the manipulation for releasing the hose clip 1 from the spread-diameter state will be described. When the releasing jig T is inserted from the second knob 8 side, the hose clip 1 can be released from the spread-diameter state in the same manner as in the first embodiment. On the other hand, when the releasing jig T is inserted from the first knob 5 side, the distal end of the releasing jig T is forced into a gap between an inside edge 13 of the arch-shaped opening 7 of the first knob 5 and the locking claw 11 and then, the releasing jig T is wrenched in the direction of arrow in FIG. 8. As a result, since the space between the inside edge 13 and the locking claw 11 is spread, the locking claw 11 disengages from the abutment face 10, moving sidewise. When the locking claw 11 is located so as to oppose the escape window 12, the spring force of the clamping ring 2 causes the locking claw 11 to pass through the escape window 12 in a moment. Consequently, the hose clip 1 is turned to the reduced-diameter state such that the hose is clamped to the pipe. Thus, in the second embodiment, the releasing jig T is inserted from either the first knob 5 side or the second knob 8 side so that the hose clip is released from the spread-diameter state, whereupon the hose clip can readily be manipulated. The locking claw 11 can axially be slid as described above also when the releasing jig T is inserted from the second knob 8 side.

On the other hand, the hose clip 1 in the reduced-diameter state is returned to the spread-diameter state for disconnection of the hose from the pipe with the pliers in the same manner as in the first embodiment.

The construction of the second embodiment is advantageous in that by the provision of the escape window, the releasing manipulation can be carried out utilizing an axial force. This releasing manipulation cannot be carried out when the hose clip is provided with two locking claws.

Figure 9:
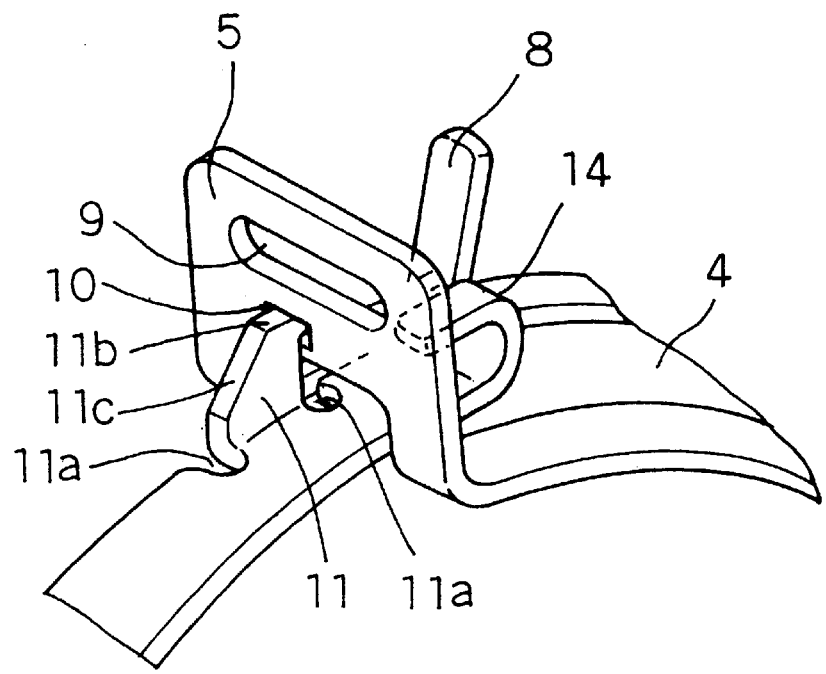
FIG. 9 is a perspective view of the hose clip of a third embodiment in accordance with the invention.

A third embodiment of the invention will be described with reference to FIGS. 9 and 10. The hose clip 1 of the third embodiment provides another solution to the problem of the limitation in the direction of insertion of the releasing jig. More specifically, one side half portion of the second knob 8 is bent toward the first knob 5 in the hose clip 1 shown in FIG. 9, thereby serving as a receiving portion 14. An upper face of the receiving portion 14 is approximately at the level of the releasing opening 9. The remaining construction in the second embodiment is the same as in the first embodiment.

Figure 10:
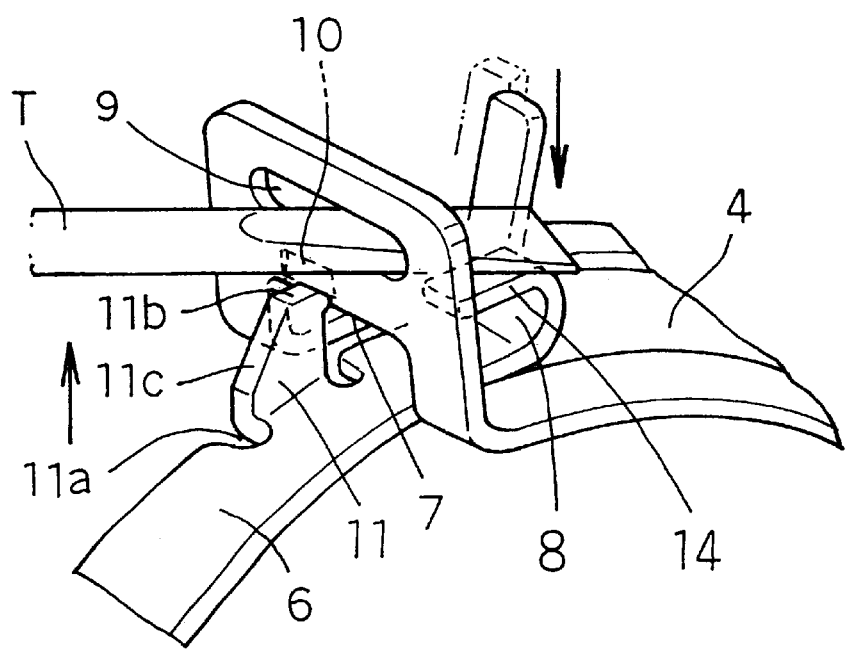
FIG. 10 is a perspective view of the hose clip, showing the releasing work.

In the releasing work, the releasing jig T is inserted through the releasing opening 9 of the first knob 5 from the locking claw 11 side as shown in FIG. 10. The distal end of the releasing jig T is applied to the receiving portion 14 of the second knob 8 and the releasing jig T is manipulated with the opening of the releasing opening 9 serving as the fulcrum so that leverage is effected substantially in the radial direction. Then, the second knob 8 is displaced radially inward. With this, the locking claw 11 is disengaged from the abutment face 10. When reaching the arch-shaped opening 7 of the first knob 5, the clamping force of the clamping ring 2 causes the locking claw 11 to pass through the arch-shaped opening 7 in a moment. As a result, the hose clip 1 is released from the spread-diameter state, so that the hose is clamped to the pipe. When the releasing jig T is inserted from the second knob 8 side, the releasing manipulation is the same as in the first and second embodiments.

On the other hand, the hose clip 1 in the reduced-diameter state is returned to the spread-diameter state for disconnection of the hose from the pipe with the pliers in the same manner as in the first embodiment.

The provision of the receiving portion 14 in the second knob 8 is advantageous in that by locating the releasing opening 9 and the distal end of the second knob 8 at the same level, the releasing jig T can be inserted from the locking claw 11 side without interference with the second knob 8 of the clamping ring 2.

Although the receiving portion 14 is formed by bending one half of the second knob 8 in the third embodiment, a stepped portion may be provided in the middle of the second knob 8, instead. However, a predetermined length of the receiving portion 14 is secured when the receiving portion 14 is formed by bending the second knob 8. Consequently, the releasing jig T can be applied to the receiving portion 14 easier as compared with the case where the stepped portion is provided. Accordingly, the working efficiency can be improved.

Figure 11:
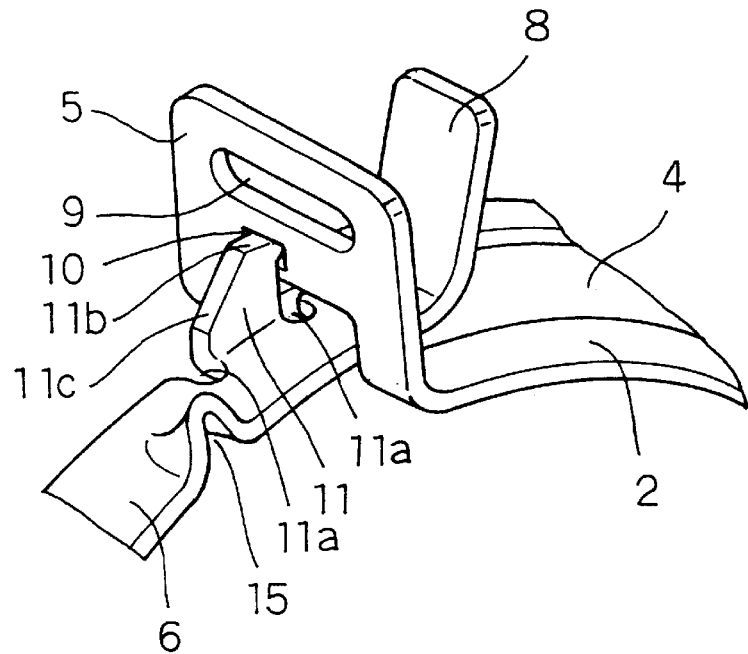
FIG. 11 is a perspective view of the hose clip of a fourth embodiment in accordance with the invention.
Figure 12:
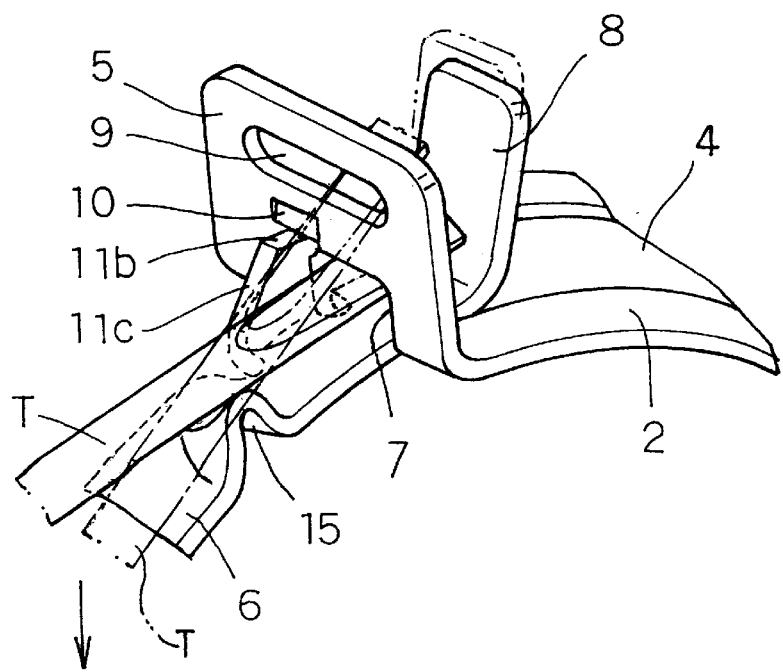
FIG. 12 is a perspective view of the hose clip, showing the releasing work.
Figure 13:
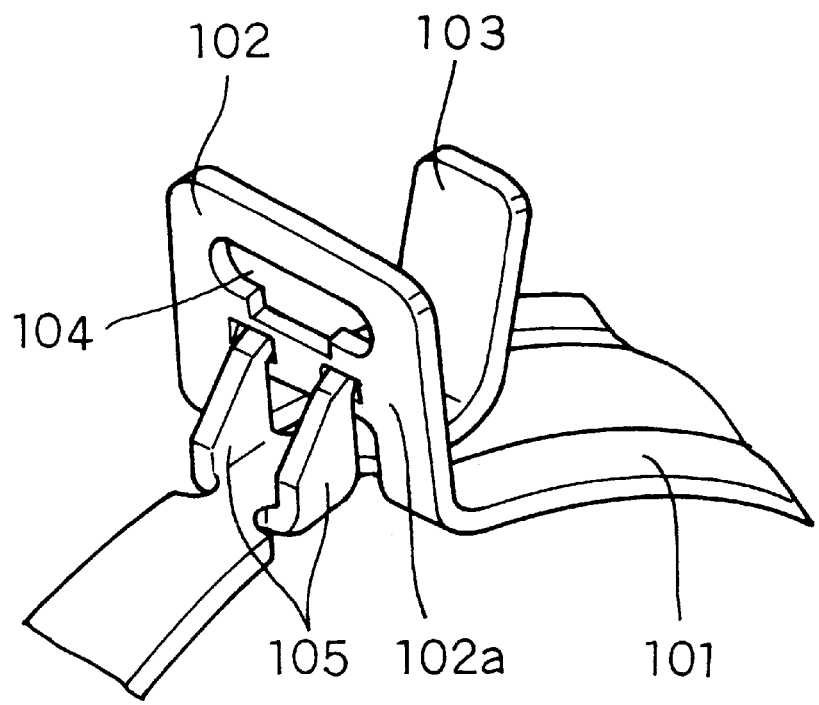
FIG. 13 is a perspective view of a conventional hose clip.
Figure 14:
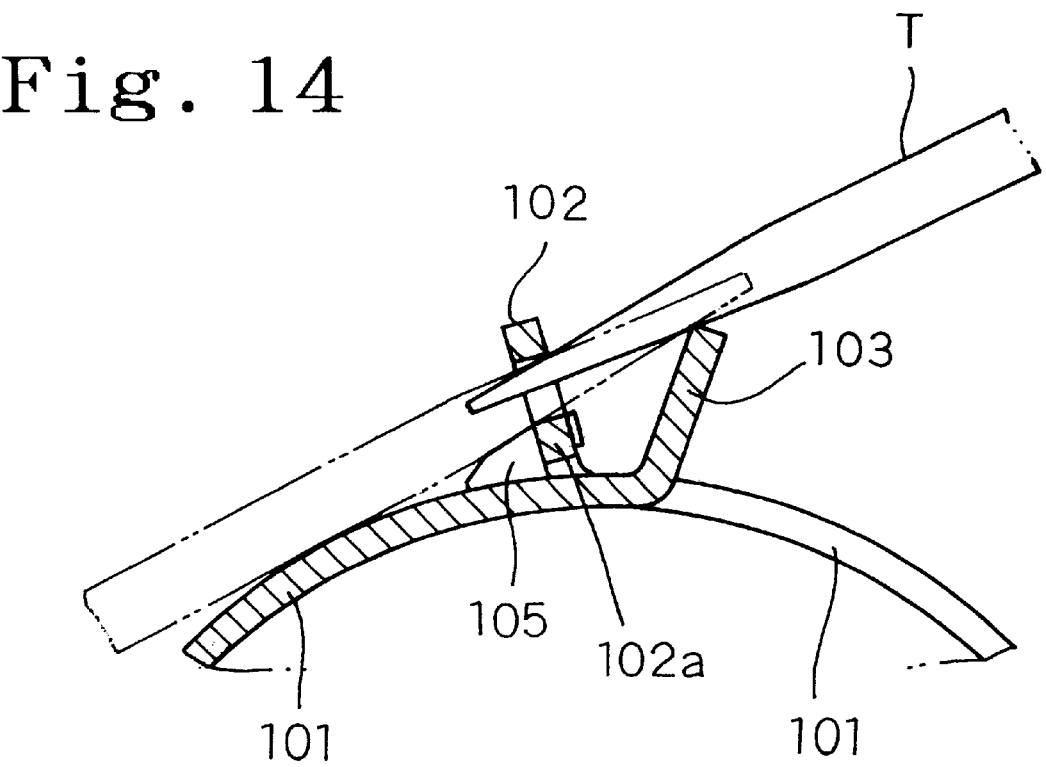
FIG. 14 is a sectional view of the conventional hose clip, showing the conventional releasing work.

FIGS. 11 and 12 illustrate a fourth embodiment of the invention. The hose clip 1 of the fourth embodiment provides another solution to the problem of limitation in the direction of insertion of the releasing jig.

In the fourth embodiment, a protrusion 15 is provided on the clamping ring 2 as a means for the releasing manipulation as shown in FIG. 11. The protrusion 15 is located on the side end opposed to the locking claw 11 near the root portion of the locking claw 11 and formed generally into the shape of a triangular pyramid.

In the releasing work, the releasing jig T is inserted through the releasing opening 9 of the first knob 5 from the locking claw 11 side as shown in FIG. 12. The releasing jig T is applied to the protrusion 15 and then pushed downward in the direction of arrow in FIG. 12 with the protrusion 15 serving as the fulcrum so that leverage is effected. Then, the first knob 5 is displaced radially outward. With this, the locking claw 11 is disengaged from the abutment face 10, passing through the arch-shaped opening 7. As a result, the hose clip 1 is released from the spread-diameter state, so that the hose is clamped to the pipe. Thus, the protrusion 15 prevents the interference between the releasing jig T and the clamping ring 2.

The hose clip 1 in the reduced-diameter state is returned to the spread-diameter state for disconnection of the hose from the pipe in the same manner as in the foregoing embodiments and accordingly, the description thereof is eliminated.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A hose clip comprising:

a clamping ring comprising a leaf spring in the form of an annular band, said clamping ring having a first end and a second end, said first end including a circumferential opening having a predetermined length and being formed along a circumferential centerline of said clamping ring, said second end comprising a narrow portion extending along the circumferential centerline of said clamping ring;

a first knob at said first end of said clamping ring and extending in a radial direction with respect to a center axis of said clamping ring, said first knob including an arch-shaped opening formed by said circumferential opening;

a second knob formed at a distal end of said narrow portion and extending in the radial direction, said clamping ring being arranged such that said narrow portion at said second end is arranged within said circumferential opening at said first end and passes under said arch-shaped opening of said first knob such that said second knob confronts said first knob;

an abutment face on a first surface of said first knob, said first surface facing away from said second knob;

a single locking claw formed between a pair of slits in said narrow portion of said clamping ring, said slits extending from an edge of said narrow portion to substantially the circumferential centerline of said clamping ring, said locking claw extending in the radial direction such that said locking claw is operable to engage said abutment face so as to hold said clamping ring in a spread-diameter state, and is operable to disengage said abutment face so as to allow said clamping ring to contract into a reduced-diameter state; and an escape window in said first knob, said escape window being located adjacent to said abutment face with respect to an axial direction of said clamping ring so as to allow said locking claw to pass therethrough, wherein said locking claw is operable to be disengaged from said abutment face by inserting a jig between an edge of said arch-shaped opening and said locking claw so as to push said locking claw in the axial direction and into said escape window, whereby said clamping ring is released from the spread-diameter state.

2. The hose clip of claim 1, wherein said first knob further includes a releasing opening for releasing said clamping ring from the spread diameter state, said releasing opening being located adjacent to said abutment face with respect to the radial direction of said clamping ring, wherein said releasing opening is adapted to enable the jig to be inserted therethrough from a first surface-side of said first knob so as to contact said second knob and an upper edge of said releasing opening, whereby the jig can be manipulated so as to press said second knob downward in the radial direction such that said clamping ring is released from the spread-diameter state.

3. The hose clip of claim 1, wherein said slits extend from a first edge of said narrow portion, further comprising a protrusion on a second edge of said narrow portion near said locking claw, said second edge being opposite said first edge.

4. The hose clip of claim 3, wherein said protrusion extends in the radial direction.

5. A hose clip comprising:

a clamping ring comprising a leaf spring in the form of an annular band, said clamping ring having a first end and a second end, said first end including a circumferential opening having a predetermined length and being formed along a circumferential centerline of said clamping ring, said second end comprising a narrow portion extending along the circumferential centerline of said clamping ring;

a first knob at said first end of said clamping ring and extending in a radial direction with respect to a center axis of said clamping ring, said first knob including an arch-shaped opening formed by said circumferential opening;

a second knob formed at a distal end of said narrow portion and extending in the radial direction, said clamping ring being arranged such that said narrow portion at said second end is arranged within said circumferential opening at said first end and passes under said arch-shaped opening of said first knob such that said second knob confronts said first knob;

an abutment face on a first surface of said first knob, said first surface facing away from said second knob;

a single locking claw formed between a pair of slits in said narrow portion of said clamping ring, said slits extending from an edge of said narrow portion to substantially the circumferential centerline of said clamping ring, said locking claw extending in the radial direction such that said locking claw is operable to engage said abutment face so as to hold said clamping ring in a spread-diameter state, and is operable to disengage said abutment face so as to allow said clamping ring to contract into a reduced-diameter state;

a releasing opening located adjacent to said abutment face with respect to the radial direction of said clamping ring; and a receiving portion at said second knob, said receiving portion being formed of a side portion of said second knob bent toward said first knob such that an upper surface of said receiving portion is substantially level with said releasing opening, wherein said releasing opening is adapted to enable a jig to be inserted therethrough from a first surface-side of said first knob so as to contact said receiving portion and an upper edge of said releasing opening, whereby the jig can be manipulated so as to press said receiving portion downward in the radial direction such that said locking claw is disengaged from said abutment face and passes through said arch-shaped opening so as to release said clamping ring from the spread-diameter state.

6. A hose clip comprising:

a clamping ring comprising a leaf spring in the form of an annular band, said clamping ring having a first end and a second end, said first end including a circumferential opening having a predetermined length and being formed along a circumferential centerline of said clamping ring, said second end comprising a narrow portion extending along the circumferential centerline of said clamping ring;

a first knob at said first end of said clamping ring and extending in a radial direction with respect to a center axis of said clamping ring, said first knob including an arch-shaped opening formed by said circumferential opening;

a second knob formed at a distal end of said narrow portion and extending in the radial direction, said clamping ring being arranged such that said narrow portion at said second end is arranged within said circumferential opening at said first end and passes under said arch-shaped opening of said first knob such that said second knob confronts said first knob;

an abutment face on a first surface of said first knob, said first surface facing away from said second knob;

a single locking claw formed between a pair of slits in said narrow portion of said clamping ring, said slits extending from a first edge of said narrow portion to substantially the circumferential centerline of said clamping ring, said locking claw extending in the radial direction such that said locking claw is operable to engage said abutment face so as to hold said clamping ring in a spread-diameter state, and is operable to disengage said abutment face so as to allow said clamping ring to contract into a reduced-diameter state;

a releasing opening for releasing said clamping ring from the spread diameter state, said releasing opening being located adjacent to said abutment face with respect to the radial direction of said clamping ring, wherein said releasing opening is adapted to enable a jig to be inserted therethrough from a first surface-side of said first knob so as to contact said second knob and an upper edge of said releasing opening, whereby the jig can be manipulated so as to press said second knob downward in the radial direction such that said clamping ring is released from the spread-diameter state; and a protrusion on a second edge of said narrow portion near said locking claw, said second edge being opposite said first edge.

7. The hose clip of claim 6, wherein said protrusion extends in the radial direction.

* * * * *